United States Patent
Kim et al.

(10) Patent No.: US 9,994,160 B2
(45) Date of Patent: Jun. 12, 2018

(54) ROOF RACK STRUCTURE

(71) Applicants: Hyundai Motor Company, Seoul (KR); Kia Motors Corporation, Seoul (KR); JIN WON CO., LTD, Gyeongju-si (KR)

(72) Inventors: Nam Cheol Kim, Suwon-si (KR); Chanjoo Moon, Hwaseong-si (KR); Jeong Ho Lee, Suwon-si (KR); Euihan Jeong, Ulsan (KR)

(73) Assignees: Hyundai Motor Company, Seoul (KR); Kia Motors Corporation, Seoul (KR); JIN WON CO., LTD., Gyeongju-si (KR)

( * ) Notice: Subject to any disclaimer, the term of this patent is extended or adjusted under 35 U.S.C. 154(b) by 356 days.

(21) Appl. No.: 14/839,758

(22) Filed: Aug. 28, 2015

(65) Prior Publication Data
US 2016/0297370 A1    Oct. 13, 2016

(30) Foreign Application Priority Data
Apr. 7, 2015    (KR) .......................... 10-2015-0049107

(51) Int. Cl.
  *B60R 9/04*    (2006.01)
(52) U.S. Cl.
  CPC ..................... *B60R 9/04* (2013.01)
(58) Field of Classification Search
  CPC ........... B60R 9/04; B60R 9/045; B60R 9/052; B60R 9/058
  See application file for complete search history.

(56) References Cited

U.S. PATENT DOCUMENTS

| | | | | |
|---|---|---|---|---|
| 4,343,419 A * | 8/1982 | Mareydt | ................... | B60R 9/04 224/326 |
| 5,016,798 A * | 5/1991 | Stapleton | .................. | B60R 9/04 224/325 |
| 6,311,882 B1 * | 11/2001 | Allison | ..................... | B60R 9/04 224/309 |
| 6,557,931 B1 * | 5/2003 | Tremmel | .................. | B60R 9/04 224/309 |
| 2006/0049322 A1 * | 3/2006 | Hirano | ..................... | B60R 9/04 248/237 |

FOREIGN PATENT DOCUMENTS

| | | |
|---|---|---|
| JP | 11-34749 A | 2/1999 |
| JP | 2012-511675 A | 5/2012 |
| KR | 10-1393508 B1 | 5/2014 |

* cited by examiner

*Primary Examiner* — Corey Skurdal
(74) *Attorney, Agent, or Firm* — Morgan, Lewis & Bockius LLP

(57) ABSTRACT

A roof rack structure may include a roof rail, which is hollow, including a hook coupling portion formed at one end portion or both end portions of a lower portion of the roof rail in a width direction thereof and integrally formed to extend in a length direction of a vehicle, and a pad including a pad hook formed at one side portion or both side portions of the pad in a width direction thereof such that the hook coupling portion of the roof rail is inserted into the pad hook, the pad formed to extend in the length direction of the vehicle.

15 Claims, 14 Drawing Sheets

A - A

ROOF RACK STRUCTURE

CROSS-REFERENCE TO RELATED APPLICATION

The present application claims priority to Korean Patent Application Number 10-2015-0049107 filed Apr. 7, 2015, the entire contents of which is incorporated herein for all purpose by this reference.

BACKGROUND OF THE INVENTION

Field of the Invention

The present invention relates to a roof rack structure, and, more particularly, to a roof rack structure including a roof rail integrally formed.

Description of Related Art

In general, roof racks are mounted on both sides of an upper portion of a roof of a vehicle body, a roof rack comprises two stanchions and a side bar coupled between the two stanchions, and thereby goods can be carried when necessary.

Two stanchions are generally made from plastic material, form both end portions of a roof rack, and play a role of supporting a side bar.

A side bar forms a body of a roof rack, and is generally made from aluminum both strength and lightness of which are excellent.

Further, a stanchion cover made from plastic material is separately produced, is combined with a stanchion, and thereby accomplishes an exterior aesthetical feature.

Assembly time and assemble-ability are deteriorated because a roof rack structure is formed by relatively multiple parts, so this needs improving.

For example, a number of parts for a roof rack structure is 32 per a vehicle, and a number of assembly places per a vehicle reaches 14 in a prior art.

Therefore, a roof rack structure is required, the roof rack structure assembly of which is improved by reducing a number of parts and exterior aesthetical feature of which is accomplished simultaneously.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a roof rack structure reducing a number of parts, improving assembly, and accomplishing exterior aesthetical feature.

According to various aspects of the present invention, a roof rack structure may include a roof rail, which is hollow, including a hook coupling portion formed at one end portion or both end portions of a lower portion of the roof rail in a width direction thereof and integrally formed to extend in a length direction of a vehicle, and a pad including a pad hook formed at one side portion or both side portions of the pad in a width direction thereof such that the hook coupling portion of the roof rail is inserted into the pad hook, the pad formed to extend in the length direction of the vehicle.

The roof rail may further include at least two mounting holes formed at an upper portion of the roof rail, and first bolt holes, disposed at positions corresponding to the at least two mounting holes, formed at a lower portion of the roof rail.

The pad further includes second bolt holes at positions corresponding to the first bolt holes.

The roof rack structure may further comprise bolts fixedly mounted on a roof of a vehicle body such that the bolts respectively pass through the second bolt holes of the pad and the first bolt holes of the roof rail sequentially, and nuts coupled to the bolts and thereby fixing the roof rail and the pad to the roof of the vehicle body.

The roof rack structure may further include mounting caps inserted into the at least two mounting holes such that the mounting caps close the at least two mounting holes.

An upper end portion of the pad hook may be disposed at an upper side of the hook coupling portion and a lower portion of the pad hook may be disposed at an inner side in the width direction of the roof rail with respect to the hook coupling portion, on a cross-section of the roof rack structure, the cross-section being perpendicular to a length direction of the roof rail.

The hook coupling portion may protrude towards an inner side in the width direction of the roof rail, on a cross-section of the roof rack structure, the cross-section being perpendicular to a length direction of the roof rail.

The pad hook may include at least two hooks protruding towards an upper side of the pad and formed towards in a length direction of the pad.

The roof rack structure of claim may further include spacers, each spacer having a third bolt hole formed therethrough and coupled to each of the bolts through the corresponding third bolt hole to adjust or fill a gap between the pad and the roof.

The spacers may be respectively mounted to the lower portion of the roof rail through the second bolt holes and the first bolt holes.

A lower portion groove may be formed on an upper surface of the lower portion of the roof rail, the lower portion groove extending in the length direction of the vehicle, and spacer hooks, each being fitted on the lower portion groove by passing through each of the first bolt holes, may be formed respectively on upper portions of the spacers.

Each of the spacer hooks may include two protruding hooks respectively protruding towards upper sides at both sides of the corresponding third bolt hole in the length direction of the vehicle.

At least two coupling holes may be formed on the lower portion of the roof rail, and coupling protrusions coupled to the at least two coupling holes may protrude from an upper surface of the pad.

Two coupling steps may be formed at both sides of each of the at least two coupling holes in the length direction of the vehicle, and a hook head may be formed at each of the coupling protrusions, the hook head fitted on the two coupling steps by passing through each of the at least two coupling holes.

The roof rail may further include hook portions, each being hook-shaped and formed towards inner sides in the width direction of the roof rail from both side ends of a lower portion of each of both end portions of the roof rail in the width direction of the roof rail, and the pad may further include locking wings formed at both end portions of the pad and inclined from an outer side towards an inner side in a length direction of the pad, such that the hook portions are fitted and locked into the locking wings by being placed from the inner side towards the outer side in the length direction of the pad.

The pad may further include support portions inclined from the inner side towards the outer side in the length direction of the pad to support the locking wings.

Both ends of the roof rail may be respectively placed and locked into fitting portions formed at both end portions of the pad, from top to bottom.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a drawing comparing a prior roof rack structure and an exemplary roof rack structure according to the present invention.

Figure 1A:
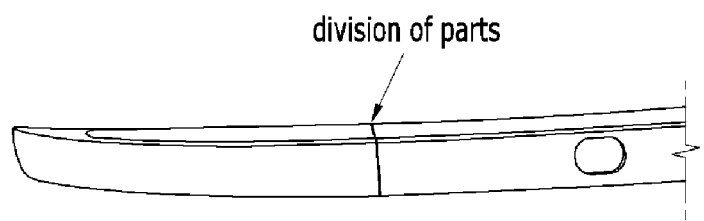
FIG. 1A and FIG. 1B are drawings comparing a prior art roof rack structure and an exemplary roof rack structure according to the present invention.

FIG. 1A shows a prior roof rack structure, and a portion where a stanchion of an end portion and a side bar of a body portion are coupled is illustrated clearly.

Figure 1B:
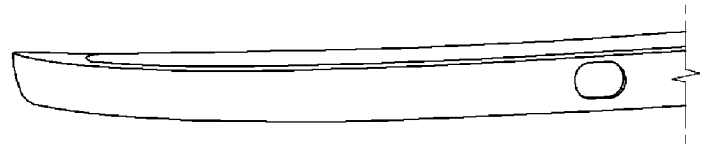

On the contrary, referring to FIG. 1B, a division portion of parts in a prior art disappears by a stanchion and a side bar being integrally formed, in exemplary roof rack structures according to the present invention.

Referring to FIG. 2, FIG. 3, FIG. 4A, FIG. 4B and FIG. 4C, exemplary roof rack structures according to the present invention may comprise a roof rail 10, which is hollow, including a hook coupling portion 15 formed at one end portion or both end portions of a lower portion 10b of the roof rail 10 in a width direction thereof and integrally formed to extend in a length direction of a vehicle and a pad 30 including a pad hook 31 formed at one side portion or both side portions of the pad 30 in a width direction thereof such that the hook coupling portion 15 of the roof rail 10 is inserted into the pad hook 31, the pad 30 formed to extend in the length direction of the vehicle.

The roof rail 10 may further include at least two mounting holes 11 formed at a upper portion of the roof rail 10 and first bolt holes 13, corresponding to the at least two mounting holes 11, formed at a lower portion of the roof rail 10.

The pad 30 may further include second bolt holes 33 corresponding to the first bolt holes 13.

The roof rack structure according to the present invention may further comprise bolts 40 fixedly mounted on a roof 5 of a vehicle body such that the bolts 40 respectively pass through the second bolt holes 33 of the pad 30 and the first bolt holes 13 of the roof rail 10 sequentially and nuts 50 coupled to the bolts 40 and thereby fixing the roof rail 10 and the pad 30 to the roof 5 of the vehicle body.

In addition, the roof rack structure may further comprise mounting caps 20 inserted into the at least two mounting holes 11 such that the mounting caps 20 close the at least two mounting holes 11.

Figure 4A:
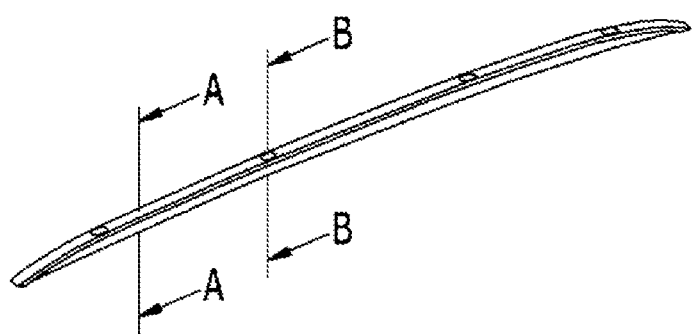
FIG. 4A, FIG. 4B, and FIG. 4C are drawings showing cross-sectional views of an exemplary roof rack structure according to the present invention.
Figure 4B:
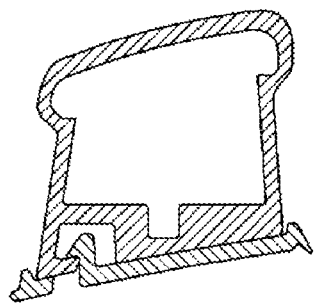
Figure 4C:
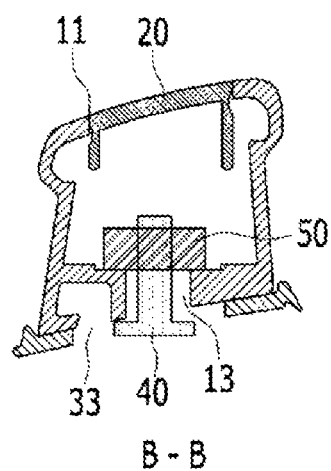

Referring to FIG. 4C, the bolts 40 are respectively coupled to the nuts 50 by respectively passing through the second bolt holes 33 and the first bolt holes 13 sequentially such that the roof rail 10 and the pad 30 are mounted to the roof 5 of the vehicle body.

Though a condition in which a lower end of one of the bolts 40 is mounted to the roof 5 of the vehicle body is not illustrated, the bolts 40 may be welding bolts welded to the roof 5.

Figure 2:
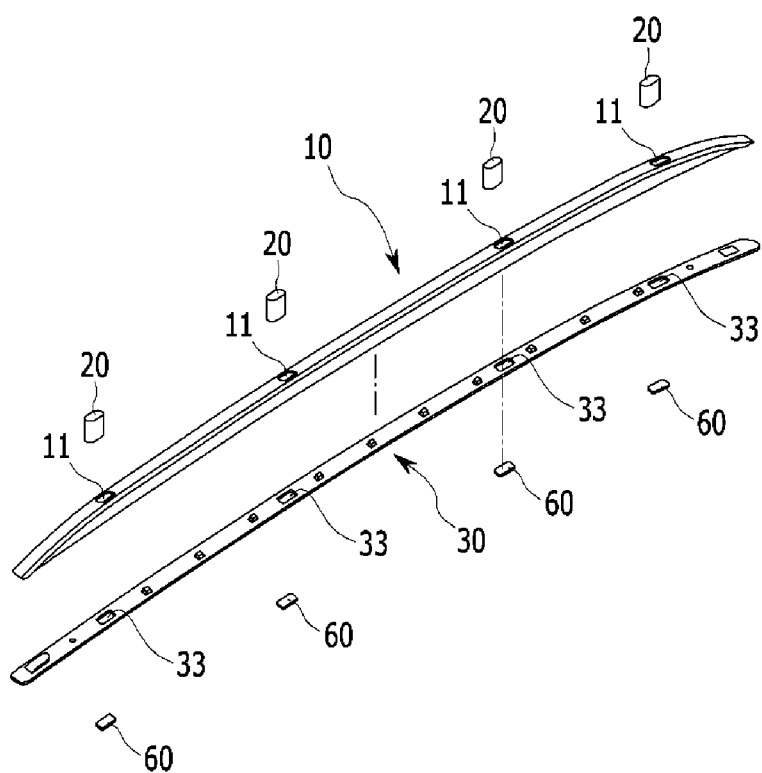
FIG. 2 is an exploded perspective view of an exemplary roof rack structure according to the present invention.

In various embodiments of FIG. 2, the at least two mounting holes 11 are composed of four, and there are four of the first bolt holes 13, four of the mounting caps 20, and four of the second bolt holes 33, corresponding to the four mounting holes 11.

However, various embodiments are not limited to the case of FIG. 2.

Figure 3:
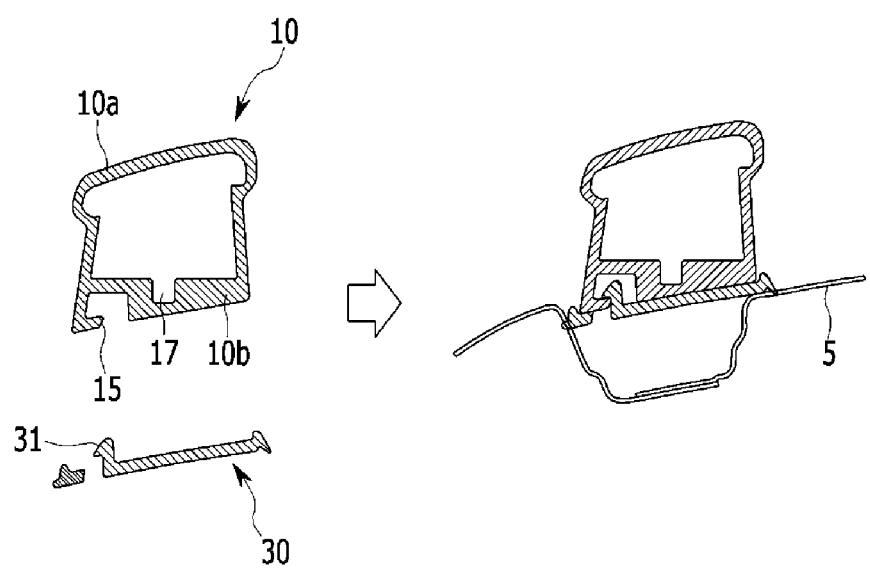
FIG. 3 is a cross-sectional view of an exemplary roof rack structure according to the present invention.

In various embodiments of FIG. 3, the hook coupling portion 15 is formed only at a left end portion of the lower portion 10b of the roof rail 10 in a width direction of the roof rail 10.

Accordingly, the pad hook 31 is also formed only at a left portion of the pad 30 in a width direction of the pad 30.

Figure 5A:
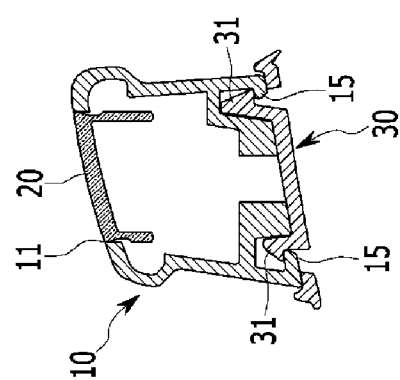
FIG. 5A, FIG. 5B, and FIG. 5C are drawings showing cross-sectional views according to the present invention.
Figure 5B:
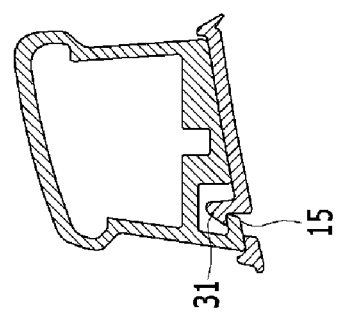
Figure 5C:
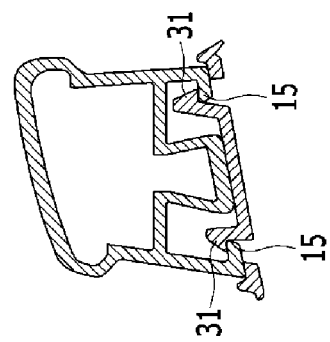

However, various embodiments are not limited to the case of FIG. 3, and referring to FIGS. 5A and 5C, the pad hook 31 may be formed at both side portions of the pad 30 in the width direction of the pad 30 and may be coupled to the hook coupling portion 15 formed at both end portions of the lower portion 10b of the roof rail 10 in the width direction of the roof rail 10.

Referring to FIG. 5A, FIG. 5B, and FIG. 5C, an upper end portion of the pad hook 31 may be disposed at an upper side of the hook coupling portion 15 and a lower portion of the pad hook 31 may be disposed at an inner side in the width direction of the roof rail 10 with respect to the hook coupling portion 15, on a cross-section of the roof rack structure, the cross-section being perpendicular to a length direction of the roof rail 10.

This is because the pad hook 31 may be formed at the inner side in the width direction of the roof rail 10 with respect to the hook coupling portion 15, and may be inserted from a lower side of the hook coupling portion 15 to an upper side thereof.

In various embodiments of FIG. 5A, FIG. 5B, and FIG. 5C, while an end portion of the hook coupling portion 15 in the width direction of the roof rail 10 slides down an inclined surface of an upper end portion of the pad hook 31, the end portion of the hook coupling portion 15 makes contact with and becomes locked by a lower surface of the upper end portion of the pad hook 31 at an end of the inclined surface.

In addition, the hook coupling portion 15 may protrude towards an inner side in the width direction of the roof rail 10, on a cross-section of the roof rack structure, the cross-section being perpendicular to a length direction of the roof rail 10.

These various embodiments are well illustrated in FIGS. 5A, 5B and 5C.

Figure 6A:
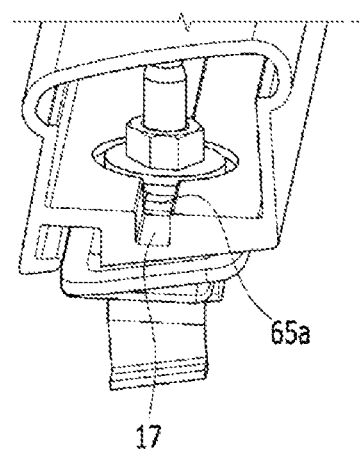
FIG. 6A and FIG. 6B are perspective views illustrating a mounting portion of an exemplary roof rack structure according to the present invention.
Figure 6B:
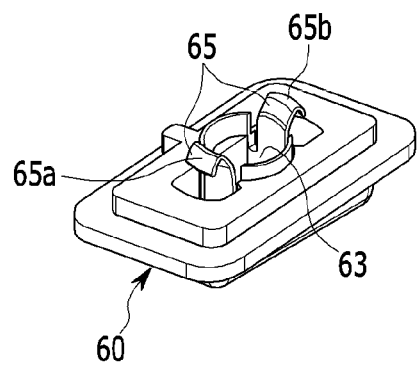

FIG. 6A and FIG. 6B are perspective views illustrating a mounting portion of an exemplary roof rack structure according to the present invention.

Referring to FIG. 2, FIG. 6A, and FIG. 6B, exemplary roof rack structures according to the present invention may further comprise spacers 60, each spacer having a third bolt hole 63 formed therethrough and coupled to each of the bolts 40 through the third bolt hole 63 to adjust or fill a gap between the pad 30 and the roof 5.

Referring to FIG. 6A and FIG. 6B, the spacers 60 may be respectively mounted to the lower portion 10b of the roof rail 10 through the second bolt holes 33 and the first bolt holes 13.

In FIG. 6A, a figure in which the pad 30 is excluded from the structure is shown in order to better illustrate a mounting method of the spacer 60.

As illustrated in FIG. 3, FIG. 6A, and FIG. 6B, a lower portion groove 17 may be formed on an upper surface of the lower portion 10b of the roof rail 10, the lower portion groove 17 extending in the length direction of the vehicle, and spacer hooks 65, each being fitted on the lower portion groove 17 by passing through each of the first bolt holes 13, may be formed respectively on upper portions of the spacers 60.

Further, each of the spacer hooks 65 may be made up of two protruding hooks 65a and 65b respectively protruding towards upper sides at both sides of the third bolt hole 63 in the length direction of the vehicle.

In various embodiments of FIG. 6A, a figure in which one of the two protruding hooks 65a is fitted on the lower portion groove 17 is shown.

Figure 7:
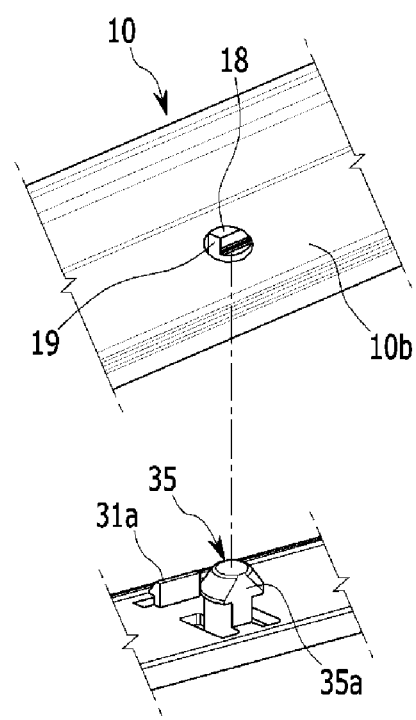
FIG. 7 is a perspective view of a lower coupling portion of an exemplary roof rack structure according to the present invention.

FIG. 7 is a perspective view of a lower coupling portion of an exemplary roof rack structure according to the present invention.

Various embodiments of FIG. 7 may be properly used for preventing slack of the pad 30, particularly when the hook coupling portion 15 is formed at only one end portion of the lower portion 10b of the roof rail 10 in a width direction thereof, and thereby the pad hook 31 is also formed at only one side portion of the pad 30 in a width direction thereof.

Such is for exemplary embodiments of FIG. 3, FIG. 4A, FIG. 4B, and FIG. 4C.

However, it is obvious that various embodiments of FIG. 7 can also be used when the roof rail 10 and the pad 30 are coupled at both sides in a width direction.

Referring to FIG. 7, at least two coupling holes 18 may be formed on the lower portion 10b of the roof rail 10 and coupling protrusions 35 coupled to the at least two coupling holes 18 may protrude on an upper surface of the pad 30.

FIG. 7 illustrates a coupling protrusion 35 and a coupling hole 18 coupled to each other.

Further, two coupling steps 19 may be formed at both sides of each of the at least two coupling holes 18 in the length direction of the vehicle, and a hook head 35a may be formed at each of the coupling protrusions 35, the hook head 35a fitted on the two coupling steps 19 by passing through each of the at least two coupling holes 18.

One of the two coupling steps 19 is shown in a lower perspective view of the roof rail 10, illustrated in an upper side of FIG. 7, and the hook head 35a passing through the coupling hole 18, is fitted on the two coupling steps 19.

Figure 8:
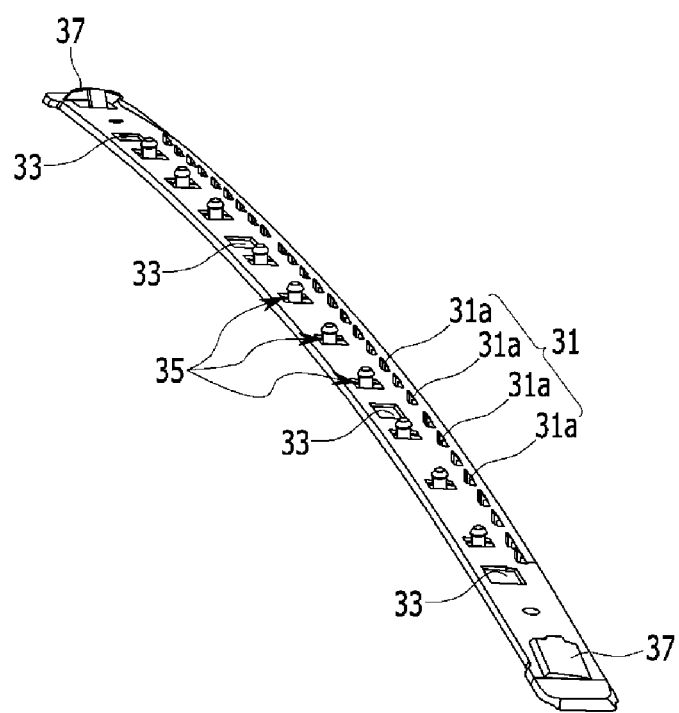
FIG. 8 is a perspective view illustrating a pad of an exemplary roof rack structure according to the present invention.

FIG. 8 is a perspective view illustrating a pad of an exemplary roof rack structure according to the present invention.

Referring to FIG. 8, the pad hook 31 may be made up of at least two hooks 31a protruding towards an upper side of the pad 30 and formed towards in a length direction of the pad 30.

A plurality of the hooks 31a is illustrated in FIG. 8.

In addition, the plurality of coupling protrusions 35 corresponding to the plurality of coupling holes 18 is also illustrated.

Various embodiments of FIG. 8 correspond to a case in which the roof rail 10 and the pad 30 are coupled only at one side in a width direction.

This is because the hooks 31a are formed only at one side in the width direction of the pad 30.

Figure 9A:
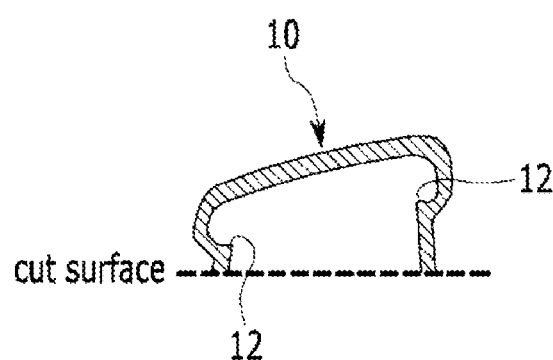
FIG. 9A and FIG. 9B are drawings illustrating a cross-section of one end portion of a roof rail of an exemplary roof rack structure according to the present invention and a method of forming a cut surface.
Figure 9B:
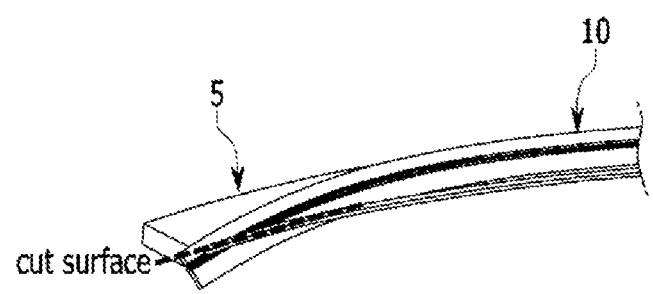

FIG. 9A and FIG. 9B are drawings illustrating a cross-section of one end portion of a roof rail of an exemplary roof rack structure according to the present invention and a method of forming a cut surface.

Figure 10:
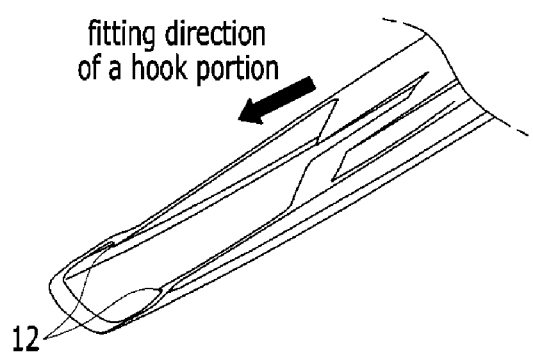
FIG. 10 is a perspective view illustrating a cut surface of one end portion of a roof rail of an exemplary roof rack structure according to the present invention and a fitting direction of a hook portion.

FIG. 10 is a perspective view illustrating a cut surface of one end portion of a roof rail of an exemplary roof rack structure according to the present invention and a fitting direction of a hook portion.

Figure 11:
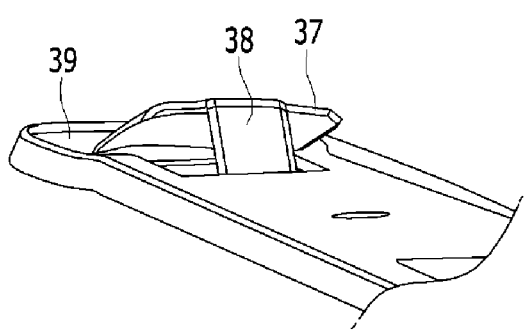
FIG. 11 is a perspective view of a coupling portion of a pad coupled to one end portion of an exemplary roof rail according to the present invention.

FIG. 11 is a perspective view of a coupling portion of a pad coupled to one end portion of an exemplary roof rail according to the present invention.

Referring to FIG. 9A and FIG. 9B, one end portion of an exemplary roof rail 10 according to the present invention may be bent along a curved surface of the roof 5, and may be cut along a dotted line in FIG. 9A and FIG. 9B such that the cut surface touches the curved surface.

In this case, on a cross-section of the one end portion of the roof rail 10, the cross-section perpendicular to a length direction of the roof rail 10, can the cut surface be shown like the dotted line of FIG. 9A and FIG. 9B.

Referring to FIG. 9A, FIG. 9B, FIG. 10, and FIG. 11, the roof rail 10 may further comprise hook portions 12, each being hook-shaped and formed towards inner sides in the width direction of the roof rail 10 from both side ends of a lower portion of each of both end portions of the roof rail 10 in the width direction of the roof rail 10, and the pad 30 may further comprise locking wings 37 formed at both end portions of the pad 30 and inclined from an outer side towards an inner side in a length direction of the pad 30, such that the hook portions 12 are fitted and locked into the locking wings 37 by being put from the inner side towards the outer side in the length direction of the pad 30.

In various embodiments of FIG. 10, the hook portions 12 are formed by the lower portion 10b, which is of both end portions of the roof rail 10, being cut such that a cut surface corresponds to a shape of a curved surface of a roof 5, a cutting direction is from an outer side to an inner side in a length direction of the roof rail 10, and thereby the hook portions 12 are inclined from an outer side towards an inner side in a length direction of the roof rail 10.

Referring to FIG. 11, the locking wings 37 are formed such that the hook portions 12 are fitted into the locking wings 37 in a fitting direction illustrated in FIG. 10.

The locking wings 37 are inclined nearly in an inclining direction of the hook portions 12, and thereby the hook portions 12 are smoothly fitted.

Both ends of the roof rail 10 may be respectively put and locked into fitting portions 39 formed at both end portions of the pad 30, from top to bottom.

Accordingly, the roof rail 10 and the pad 30 can be coupled strongly.

In addition, the pad 30 may further comprise support portions 38 inclined from the inner side towards the outer side in the length direction of the pad 30 to support the locking wings 37.

Strength of the coupling of the both ends of the roof rail 10 and the both end portions of the pad 30 can be properly maintained, by the support portions 38.

Figure 12:
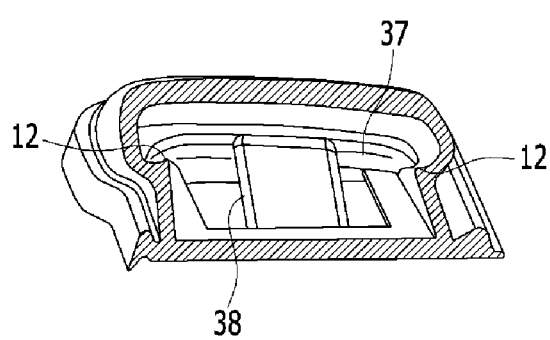
FIG. 12 is a drawing illustrating a coupling condition of one end portion of an exemplary roof rail and an exemplary pad according to the present invention.

FIG. 12 is a drawing illustrating a coupling condition of end portions of an exemplary roof rail and an exemplary pad according to the present invention.

FIG. 12 illustrates a result of cutting the roof rail 10 and the pad 30 in a condition of coupling of end portions of the roof rail 10 and the pad 30 in an inclining direction of the support portions 38.

In FIG. 12, a condition in which one of the hook portions 12 is coupled to a lower surface of one of the locking wings 37 and one end portion of the roof rail 10 is fitted in one of the fitting portions 39 is illustrated.

As explained in detail, numbers of parts of exemplary roof rack structures are reduced, assemblies of them are improved, and exterior aesthetical features of them can also be accomplished, according to the present invention.

Further, by deletion of coupling structures, in other words, realization of roof rail integrally formed, strength of a roof rack structure is improved and cost of the structure is also reduced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A roof rack structure comprising:
   a roof rail, which is hollow, including a hook coupling portion formed at one end portion or both end portions of a lower portion of the roof rail in a width direction thereof and integrally formed to extend in a length direction of a vehicle; and
   a pad including a pad hook formed at one side portion or both side portions of the pad in a width direction thereof such that the hook coupling portion of the roof rail is inserted into the pad hook, the pad formed to extend in the length direction of the vehicle,
   wherein the roof rail further includes:
      at least two mounting holes formed at an upper portion of the roof rail; and
      first bolt holes, disposed at positions corresponding to the at least two mounting holes, formed at a lower portion of the roof rail.

2. The roof rack structure of claim 1, wherein the pad further includes second bolt holes at positions corresponding to the first bolt holes.

3. The roof rack structure of claim 2, further comprising:
   bolts fixedly mounted on a roof of a vehicle body such that the bolts respectively pass through the second bolt holes of the pad and the first bolt holes of the roof rail sequentially; and
   nuts coupled to the bolts and thereby fixing the roof rail and the pad to the roof of the vehicle body.

4. The roof rack structure of claim 3, further comprising:
   spacers, each spacer having a third bolt hole formed therethrough and coupled to each of the bolts through the corresponding third bolt hole to adjust or fill a gap between the pad and the roof.

5. The roof rack structure of claim 4, wherein:
   the spacers are respectively mounted to the lower portion of the roof rail through the second bolt holes and the first bolt holes.

6. The roof rack structure of claim 5, wherein:
   a lower portion groove is formed on an upper surface of the lower portion of the roof rail, the lower portion groove extending in the length direction of the vehicle, and
   spacer hooks, each being fitted on the lower portion groove by passing through each of the first bolt holes, are formed respectively on upper portions of the spacers.

7. The roof rack structure of claim 6, wherein each of the spacer hooks comprises two protruding hooks respectively protruding towards upper sides at both sides of the corresponding third bolt hole in the length direction of the vehicle.

8. The roof rack structure of claim 1, further comprising:
mounting caps inserted into the at least two mounting holes such that the mounting caps close the at least two mounting holes.

9. The roof rack structure of claim 1, wherein:
an upper end portion of the pad hook is disposed at an upper side of the hook coupling portion and a lower portion of the pad hook is disposed at an inner side in the width direction of the roof rail with respect to the hook coupling portion, on a cross-section of the roof rack structure, the cross-section being perpendicular to a length direction of the roof rail.

10. The roof rack structure of claim 1, wherein:
the hook coupling portion protrudes towards an inner side in the width direction of the roof rail, on a cross-section of the roof rack structure, the cross-section being perpendicular to a length direction of the roof rail.

11. The roof rack structure of claim 1, wherein the pad hook comprises at least two hooks protruding towards an upper side of the pad and formed toward an inner side in a length direction of the pad.

12. The roof rack structure of claim 1, wherein:
the roof rail further comprises hook portions, each being hook-shaped and formed towards inner sides in the width direction of the roof rail from both side ends of a lower portion of each of both end portions of the roof rail in the width direction of the roof rail, and wherein:
the pad further comprises locking wings formed at both end portions of the pad and inclined from an outer side towards an inner side in a length direction of the pad, such that the hook portions are fitted and locked into the locking wings by being placed from the inner side towards the outer side in the length direction of the pad.

13. The roof rack structure of claim 12, wherein the pad further comprises support portions inclined from the inner side towards the outer side in the length direction of the pad to support the locking wings.

14. The roof rack structure of claim 12, wherein:
both ends of the roof rail are respectively placed and locked into fitting portions formed at both end portions of the pad, from top to bottom.

15. A roof rack structure comprising:
a roof rail, which is hollow, including a hook coupling portion formed at one end portion or both end portions of a lower portion of the roof rail in a width direction thereof and integrally formed to extend in a length direction of a vehicle; and
a pad including a pad hook formed at one side portion or both side portions of the pad in a width direction thereof such that the hook coupling portion of the roof rail is inserted into the pad hook, the pad formed to extend in the length direction of the vehicle,
wherein at least two coupling holes are formed on the lower portion of the roof rail, and coupling protrusions coupled to the at least two coupling holes protrude from an upper surface of the pad,
wherein two coupling steps are formed at both sides of each of the at least two coupling holes in the length direction of the vehicle, and
wherein a hook head is formed at each of the coupling protrusions, the hook head fitted on the two coupling steps by passing through each of the at least two coupling holes.

* * * * *